United States Patent [19]

Dzwinel

[11] Patent Number: 4,633,182

[45] Date of Patent: Dec. 30, 1986

[54] METHOD AND SYSTEM FOR DIRECT PROSPECTING OF HYDROCARBON DEPOSITS

[75] Inventor: Jan Dzwinel, Cracow, Poland

[73] Assignee: Instytut Gornictwa Naftowego i Gazownictwa, Cracow, Poland

[21] Appl. No.: 572,165

[22] Filed: Jan. 18, 1984

[30] Foreign Application Priority Data

Mar. 3, 1983 [PL] Poland .................................. 240884

[51] Int. Cl.⁴ .............................................. G01V 3/08
[52] U.S. Cl. .................................................. 324/335
[58] Field of Search ............... 324/334, 335, 336, 337, 324/347, 358, 359, 363, 364

[56] References Cited

FOREIGN PATENT DOCUMENTS 102665 6/1979 Poland .

Primary Examiner—Ernest F. Karlsen
Assistant Examiner—Walter E. Snow
Attorney, Agent, or Firm—Ladas & Parry

[57] ABSTRACT

An electrical geophysical method and system for direct and diagnostic prospecting of hydrocarbon deposits. Numerous combinations of connections of the transmitting array and numerous combinations of frequencies are employed in sequence to create many unique electromagnetic fields in the earth, first over a number of locations known to contain hydrocarbons and known to be barren, then over prospecting locations. Numerous electric and magnetic components of each electromagnetic field are measured with a receiving array located in the near field of the transmitting array. The huge amounts of measured data are processed using Pattern Recognition techniques in a processor to yield directly a probability measure of hydrocarbon occurrence at each prospecting location.

2 Claims, 2 Drawing Figures

METHOD AND SYSTEM FOR DIRECT PROSPECTING OF HYDROCARBON DEPOSITS

BACKGROUND

This invention relates to a method and system for direct and diagnostic prospecting of hydrocarbon deposits.

The use of electrical geophysical techniques in the search for subsurface anomalies is well known in applications such as the search for metallic ores, sulphides, groundwater, and hydrocarbons. These systems rely on the measurement of the electrical response in the earth to either natural magnetotelluric currents or currents induced from a man-made source.

In electrical prospecting for hydrocarbons, the effects of hydrocarbons on the electrical characteristics of rocks are generally very difficult to separate from other electrical effects due to geological structure, near surface inhomogeneities, and magnetotelluric noise. Prior art electrical hydrocarbon prospecting methods use interpretation techniques which rely on mathematical modelling in an attempt to determine the thickness and resistivity of the various layers in the earth, which is an indirect approach.

The interpretation techniques used in these prior art methods are extremely time-consuming and are incapable of processing the large amount of field data required to reliably and diagnostically determine the presence of hydrocarbons. They are limited to being able to delineate a very small number of resistive layers.

It would be very helpful in the search for hydrocarbon deposits using electrical geophysical methods if a much larger quantity of data was collected and interpreted in order to more diagnostically distinguish the electrical responses due to hydrocarbons from the responses due to other electrical anomalies.

Because of the limitations on the quantity of data that may be interpreted in prior art methods, the transmitting and receiving equipment and field arrays used in these prior art methods to produce and measure the effects of induced currents in the earth have not been designed or built to accommodate the combination of a large number of transmitting array configurations, frequencies, and receiving array configurations. Thus, these prior art techniques have had severe limitations in direct and diagnostic prospecting for hydrocarbons.

INTRODUCTION TO THE PRESENT INVENTION

The object of the present invention is to provide a method and system whereby a much larger quantity of electrical data may be generated and processed than has been achieved in prior electrical hydrocarbon prospecting methods and systems in order to provide a direct and diagnostic indication of the presence or absence of hydrocarbons.

A feature of the present invention is that by means of multiple sources of alternating current feeding a star array of injection electrodes and one or more transmitting induction loops, a number of different electromagnetic fields are generated in the earth in sequence.

Another feature of the present invention is that by means of a star array of receiving electrodes and an orthogonal set of three magnetometers, the phase and amplitude of electromagnetic signals are measured with the magnetometers and various combinations of receiving electrode connections over numerous combinations of transmitting electrode connections and frequencies of the electromagnetic field within the band of 0.01 to 10 Hz., with said phase and amplitude data being recorded on a data storage device.

Another feature of the present invention is that a set of training measurements is first taken at each of a number of locations known to be hydrocarbon bearing and a number of locations known to be non-hydrocarbon bearing and using the data measured at these known locations to form reference patterns to which data over prospecting locations may be compared and classified in a data processor using Pattern Recognition Theory and Kernel Discriminant Analysis.

These and other features will become apparent from the following description of the Invention in conjunction with the accompanying drawings.

DESCRIPTION OF THE INVENTION

Figure 1:
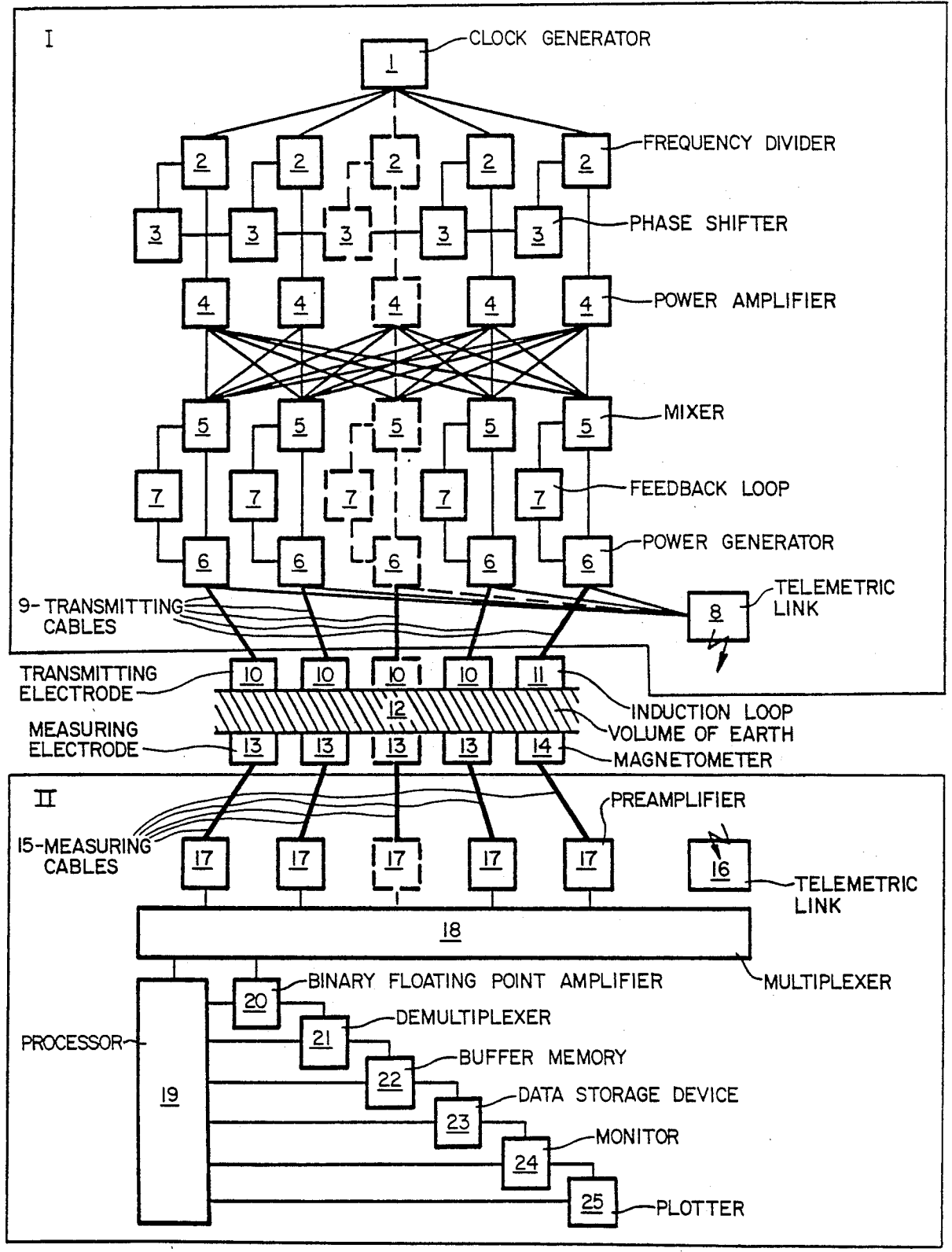
FIG. 1 shows a block diagram of the System.

SYSTEM:

Known from Polish Pat. No. 102,665, the System consists of a transmitting part and a receiving/processing part which are linked through the earth's subsurface and through a telemetric link. The System will now be described in greater detail in conjunction with FIG. 1 and FIG. 2.

Transmitting Part:

The transmitting part has a clock generator 1 which, through frequency dividers 2, phase shifters 3, and power amplifiers 4, is connected with mixers 5. The mixers 5, forming complex waveforms, are connected in parallel through a feedback loop 7 and power generators 6. The complex waveforms are transmitted through transmitting cables 9 to transmitting electrodes 10 and induction loop(s) 11. These components of the System will now be described in greater detail.

The clock generator 1 generates a reference frequency $f_o$. This signal is divided by frequency dividers 2 to a signal selected in the range of 0.01 to 10 Hz., which is carried on four channels. In addition, any of the first four harmonics of the selected frequency may also be selected and directed to any of the 4 channels. Phase shifters 3 shift the phase of any three channels in relation to the fourth by any selected integer value of degrees in the range of 1° to 360°.

Each channel feeds one power amplifier 4. The four power amplifiers are used to drive the control modules of four power generators 6, and may be cross-connected through the mixers 5 to produce complex waveforms. The voltage and current of each power generator output is measured and supplies negative feedback loops 7 which are used to stabilize the system and to speed up the response. Power generators 6, through transmitting cables 9, supply current to transmitting electrodes 10 or induction loop(s) 11. Each generator 6 is grounded to a common transmitting electrode positioned at the center of the transmitting array. When the induction loop(s) 11 is employed, any number of power generators 6 may be connected in series to power them. An electromagnetic signal is emitted into the volume of earth 12 between the transmitting part and the receiving/processing part when current is supplied to the transmitting electrodes 10 or the induction loop(s) 11. A set of relays (not shown) is used to interconnect the transmitting electrodes 10 and the induction loop(s) 11 to the power generators 6, which allows the selection of any of a very large number of different connections. The output signal from a selected power generators 6 is also transmitted as a reference signal via a telemetric link 8 to the receiving/processing part of the System.

Receiving/ Processing Part:

The induced electric field is measured in a number of directions on the earth's surface with measuring electrodes 13, with circuits formed between the central measuring electrode and each of the surrounding measuring electrodes, and the induced magnetic field is measured in 3 directions with mutually orthogonal magnetometers 14. The central measuring electrode is connected as a common ground to the other measuring electrodes. The measured responses are transmitted via measuring cables 15 to a data collecting and recording device which consists of preamplifiers 17, multiplexer 18, processor 19, binary floating point amplifier 20, demultiplexer 21, buffer memory 22, and data storage device 23.

The data collecting and recording device accepts as inputs the signals received by the measuring electrode circuits and the magnetometers, as well as the reference signal from the telemetric link 16. The signals (excluding the reference signal) are filtered and preamplified in preamplifiers 17. The signals (including the reference signal) then enter multiplexer 18, which multiplexes the input signals. A processor 19 performs a number of functions, one of these being to control a binary floating point amplifier 20 which automatically amplifies each signal to within a preprogrammed range such that the signal may be accepted in an analog to digital convertor (not shown). The digitized signal passes through a demultiplexer 21 and buffer memory 22 before being recorded on the data storage device 23. The processor, in addition to its other functions, controls the operation of these three devices.

The processor 19 also performs the data processing once all the signals have been recorded over all the combinations of transmitted frequencies and transmitting electrode 10 or induction loop(s) 11 connections, for a number of known hydrocarbon bearing locations and a number of known barren locations. The processor 19 assembles the data from each location in the form of a vector point in multidimensional space. The set of all such points defines a set of patterns in the multidimensional space which may then be processed according to established Pattern Recognition principles, as will become apparent. The results may be presented on a monitor 24 and a plotter 25 in the form of a probability level of hydrocarbon occurrence over all the prospecting locations.

METHOD:

Known also from Polish Pat. No. 102,665, the basic steps of the method according to the invention consist in choosing a set of frequencies in the range of 0.01 to 10 Hz. and a set of combinations of power generator/ transmitting electrodes/ induction loop(s) connections, each type of connection being able to provide a unique current injection pattern and thus a unique electromagnetic field in the earth's subsurface. Current is directed to either the transmitting electrodes or the induction loop(s), but not simultaneously to both.

By applying currents to either the transmitting electrodes or the induction loop(s), generating electromagnetic fields in the earths's subsurface at a number of locations known to be overlying hydrocarbons and a number of locations known to be barren, using each of the said connections in turn in combination with each of the said chosen frequencies in turn, each combination of connections and frequency representing an element of what will hereinafter be referred to as the frequency-spatial code.

Measuring, with a series of receiving electrode circuits and magnetometers, waveforms representing the electric and magnetic components of each induced electromagnetic field in turn at each frequency in turn for each said location.

Recording said waveforms, along with reference waveforms received via a telemetric link from the transmitting array, on a data storage device.

Extracting the phase and amplitude of each said waveform. The phase may be extracted by comparing measured waveforms to reference waveforms.

For each said location, assembling said phase and amplitude values into a multidimensional vector, said values representing attributes of the electromagnetic behaviour of the volume of earth beneath the said location.

Representing each said vector as a single vector point in multidimensional space. The set of vector points representing known hydrocarbon bearing locations will tend to form clusters in this multidimensional space, as will the set of vector points representing known barren locations.

Performing a series of measurements over each of a number of prospecting locations, i.e. locations for which it is desired to know whether or not hydrocarbons exist, using the same frequency-spatial code as was used in previous measurements, then extracting the phase and amplitude and assembling the data from each prospecting location in the form of a vector point in multidimensional space as was performed for previous measurements.

Using established Pattern Recognition techniques and Kernel Discriminant Analysis, determining the location of each vector point in the multidimensional space and, based upon its geometric distance in said space from the clusters of vector points representing known hydrocarbon bearing locations and the clusters of vector points representing known barren locations, assigning it a level of probability of hydrocarbon occurrence.

Plotting the probability level that has been assigned to each prospecting location on a map, which is in effect a map of the level of probability of hydrocarbon occurrence over the explored area.

Figure 2:
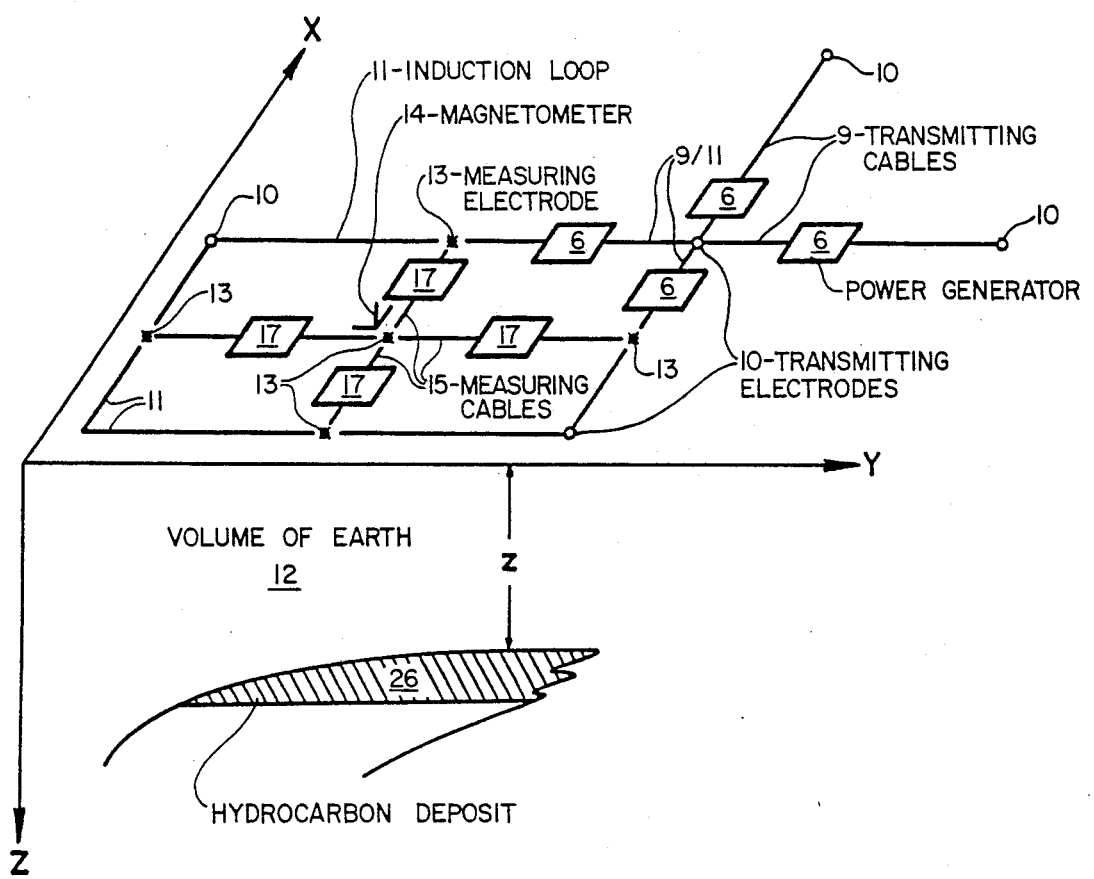
FIG. 2 shows an example of the preferred embodiment of the physical arrangement of the System over a cross section of subsurface.

The Method according to the invention will now be described in greater detail with respect to FIG. 1 and FIG. 2.

Transmitting electrodes 10 are arranged in the form of a star so that one of them is situated at its center. Transmitting cables 9 are laid out to connect the power generators 6 to the transmitting electrodes 10. Each induction loop 11 consists of a square layout of cable, two sides of this square comprising the cables feeding two adjacent electrodes.

Through combinations of selected connections of power generators 6 to the transmitting electrodes 10 or induction loop(s) 11 and selected phase shifts provided by phase shifters 3, and the selection of frequencies in frequency dividers 2, many unique current injection patterns are formed. The set of chosen injection patterns forms a frequency spatial code. Denoting the number of said combinations of connections and phase shifts by $n_T$ and the number of said frequencies by f, the total number of injection patterns K (i.e. the number of elements of the frequency spatial code) is given by:

$$K = n_T \times f \quad (1)$$

In one embodiment of the Invention, five measuring electrodes 13 and three orthogonal magnetometers 14 are laid out within the induction loop(s) 11, with one measuring electrode positioned at the center of said loop(s), and each of the other four measuring electrodes positioned at the midpoint of each side of said loop(s). The magnetometers 14 are positioned at the center of said loop(s). In another embodiment of the Invention, a different number of transmitting electrodes 10 and measuring electrodes 13 may be employed, and up to four induction loops and receiving arrays may be simultaneously employed.

The length of the sides of the induction loop(s) 11 is determined according to the following conditions:

$$1/5 \leq a/Z \leq 1 \quad (2)$$

where
a = the length of the sides of the induction loop(s)
Z = the maximum prospecting depth desired.

Measurements are carried out over all K (see Equation 1) number of current injection patterns. A number of different measurements are performed simultaneously to measure various components of the electric field and three orthogonal components of the magnetic field. Denoting the number of types of measurements by $n_R$, let the total number of combinations of injection patterns and measurement types be given by $K_T$, where $$K_t = K \times n_R \quad (3)$$

Thus, at each location, $K_T$ is the total number of unique measurements which are performed. If measurements are taken over a volume of earth 12 containing a hydrocarbon deposit 26, the measured responses will differ from responses measured over a barren volume. After being filtered and analog to digital converted, measurements are recorded on data storage device 23.

The recorded measurements are loaded back into the processor 19. Each of the measurements consists of a number of cycles of a waveform, from which the phase and amplitude may be extracted in the processor 19 using Fast Fourier Transforms. Thus, the total number of phase and amplitude values obtained for each location will be $K_T \times 2$. These values are assembled in the form of a vector. The concept of a multidimensional vector is well known to those familiar with linear algebra.

Each such vector may be represented as a single vector point in multidimensional space. Each such vector point will have a unique location in this multidimensional space, this location depending on the measured phase and amplitude values constituting this vector point. According to established principles of Pattern Recognition, vector points exhibiting similar characteristics tend to cluster together in this multidimensional space, some clusters representing hydrocarbon bearing locations and others barren locations. These clusters will be some distance apart in the multidimensional space, the degree of this separation being a function of the degree of dissimilarity between them. Measurements taken at certain combinations of frequencies and transmitting electrode 10/transmitting induction loop(s) 11 connections will tend to provide better cluster separation than others. Thus, after measurements over known hydrocarbon bearing locations and known barren locations are complete, those frequencies and connections which provide the least optimal cluster separation may be determined, and before measurements at prospecting locations proceed, an optimal subset of the original injection patterns may be derived, thus measurements over prospecting locations may be performed using only this optimized subset of injection patterns.

After measurements have been completed at prospecting locations, the data from each such prospecting location is put in the form of a multidimensional vector, as was performed for known hydrocarbon bearing and known barren locations. Each such vector will be of $K_T$ dimensions if either phase or amplitude are used in the pattern recognition, or of $2 \times K_T$ dimensions if both phase and amplitude are used in the pattern recognition. Each such vector may be represented as a vector point in multidimensional space of the same number of dimensions as said vector. The position of each such vector point with respect to the clusters in the multidimensional space can be used to determine a probability level of hydrocarbon occurrence at the prospecting location. Thus, if a vector point is located at the center of a cluster representing hydrocarbon bearing locations, it may be assigned a probability level of 1. If it is located at the center of a cluster representing barren locations, it may be assigned a probability level of $-1$. At any point between clusters, it will be assigned some value between two outer limits.

The probability level that is assigned to each location can be plotted on a map. Once drilling results are obtained for a prospecting location, this location may be used as an additional known location. The Pattern Recognition process may then be reperformed and a revised map produced.

The quantity of data that may be practically and meaningfully processed according to the Method of the Invention is many times greater than any prior art Method. In one embodiment of the Method, measurements may be carried out at each location using 10 frequencies f in the range of 0.01 to 10 Hz. over 10 combinations of transmitting electrode/induction loop(s) connections $n_T$ and with 4 components of the electric field and 3 components of the magnetic field being measured ($n_R = 4+3 = 7$). In this instance, according to Equation (1), $$K = n_T \times f = 10 \times 10 = 100$$

and, according to Equation (3), $$K_T = K \times n_R = 100 \times (4+3) = 700$$

Thus, if both phase and amplitude are used in the analysis, $2 \times K_T = 1400$ unique attributes are processed for each location. By measuring and processing such a large quantity of data, the Invention provides directly, objectively, and diagnostically information on the presence or absence of hydrocarbons, thereby reducing the time and cost of hydrocarbon exploration. By placing the receiving array within the near field of the transmitting array, precise information on the existence and location of hydrocarbons is obtained.

I claim:

1. An electrical geophysical method for direct and diagnostic prospecting of hydrocarbon deposits, consisting in that
    (a) a transmitting array is set up with transmitting electrodes forming a star pattern, and square transmitting induction loop(s), three corners of each said loop being defined by the locations of the central and two adjacent outer electrodes;
    (b) a measuring array is set up within each said loop, with one measuring electrode positioned at the center of the loop and the other measuring electrodes positioned at the midpoint of each side of the loop to form a star shape, and three orthogonal magnetometers positioned near the center of the loop;
    (c) these arrays are set up at a number of locations on the earth's surface overlying known hydrocarbon deposits and known barren volumes;
    (d) for each such positioning of these arrays, signals are produced at a number of frequencies within the frequency range of about 0.01 cycles per second to about 10 cycles per second;
    (e) for each such frequency, the signal is amplified and used to power numerous combinations of connections of transmitting electrodes or transmitting induction loop(s), each such connection representing a unique electromagnetic wave code and producing a unique electromagnetic field in the earth's subsurface;
    (f) the measuring array is used to measure the various components of each electromagnetic field at each combination of transmitted frequency and electromagnetic wave code, said components being in the form of waveform signals and being measured simultaneously by circuits formed by various combinations of measuring electrode connections and by the orthogonal magnetometers;
    (g) the processor forming part of the receiving system is programmed, using commonly used Pattern Recognition and cluster analysis methods, in such a way that the phase and amplitude values of the waveform signals obtained from locations over known hydrocarbon reserves and known barren volumes are recorded on a data storage device, then separated into classes in said processor according to whether the location is hydrocarbon bearing or barren, with values obtained from locations with variable quantities of hydrocarbon reserves forming subclasses within the class of values obtained from known hydrocarbon bearing locations, the classified values being re-recorded on a data storage device;
    (h) an identical set of measurements is made at each of a number of prospecting locations (i.e. locations for which it is desired to know whether or not hydrocarbons exist), the set of such locations comprising a geophysical measuring grid, whereafter the set of phase and amplitude values derived from each such prospecting location is stored on a data storage device and then compared in the processor to the stored classes of values representing hydrocarbon bearing and barren locations, each said prospecting location being assigned a level of probability based on the degree of pattern recognition to each of said classes;
    (i) after drilling confirms a new deposit or a barren zone at a prospecting location, it may be reclassified as a known hydrocarbon bearing location or a known barren location, and the data from said prospecting location may be reprocessed along with all other data obtained from known hydrocarbon bearing, barren and prospecting locations to produce a revised value of the level of probability for each prospecting location.

2. An electrical geophysical system for direct and diagnostic prospecting of hydrocarbon deposits consisting of a transmitting part and a receiving/processing part connected to each other through the air via a telemetric link and through the earth by a transmitting array and a receiving array, the transmitting array consisting of an arrangement of transmitting electrodes arranged in a star pattern and transmitting induction loop(s), and the receiving array consisting of an arrangement of receiving electrodes arranged in a star pattern and magnetometers, characterized in that;
    (a) the transmitting part has four to eight independent frequency dividers controlled by a clock generator, frequency dividers being connecting to mixers through phase shifters and power amplifiers and providing to the mixers electric currents having four to eight independent frequency bands, and
    the mixers are connected to power generators and induce in each of the power generators independent combinations of frequency bands, thus allowing many different combinations of frequencies to be produced;
    the power generators are independently connected to various electric transmitting circuits, thus allowing many different combinations of transmitting circuit connections to be employed, said circuits comprising the arrangement of transmitting electrodes and transmitting induction loop(s) spread out on the earth's surface in such a way that the cables laid down to connect the power generators to the transmitting electrodes form a star, with two adjacent arms of said star forming two sides of a transmitting induction loop;
    (b) the receiving part has
    receiving electrodes and receiving magnetometers which are laid out such that one receiving electrode and the three receiving magnetometers are located at the center of each transmitting induction loop, and the other receiving electrodes are located at the midpoint of each side of each transmitting induction loop, said receiving electrodes and receiving magnetometers forming numerous combinations of receiving circuits;
    filters which filter the signals received by the receiving circuits, and multiplexer which multiplexes said signals connected to binary floating point amplifier controlled by processor, processor also controlling the operation of demultiplexer and buffer memory, through which said signals pass in turn, and data storage device, in which said signals are recorded, and processor also performing, using programs stored on data storage device, pattern recognition and cluster analysis which creates patterns of the measured signals which characterize known hydrocarbon deposits and known barren locations, these patterns being stored on data storage device, whereafter the signals recorded over prospecting locations are classified according to said storage patterns in processor, the results of this classification being recorded on data storage device and presented on a monitor and a plotter which are connected to processor and data storage device.

* * * * *